Sept. 29, 1931.   W. H. HART   1,824,886
HINGE CONSTRUCTION
Filed June 19, 1929
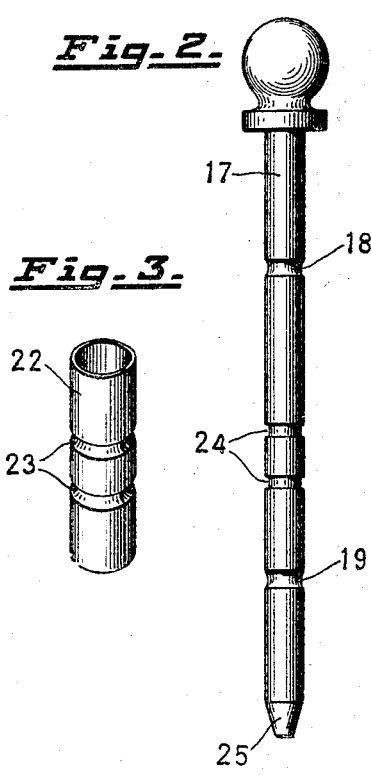
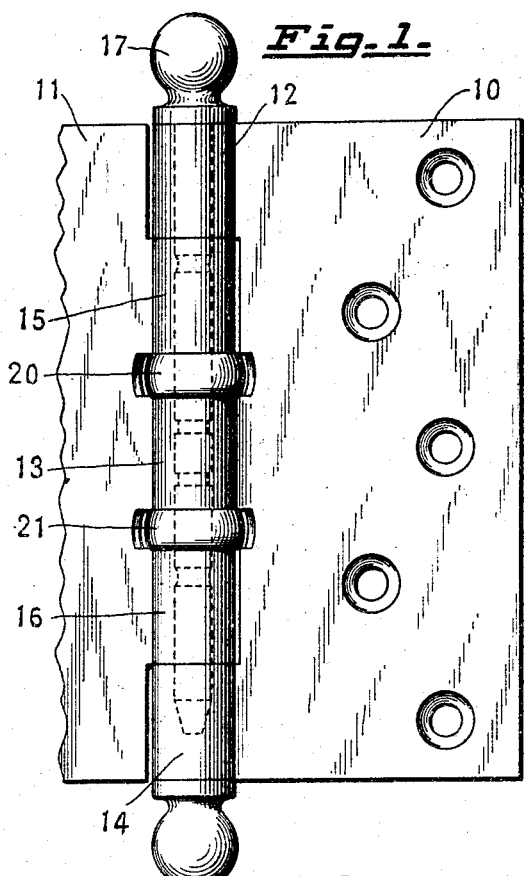
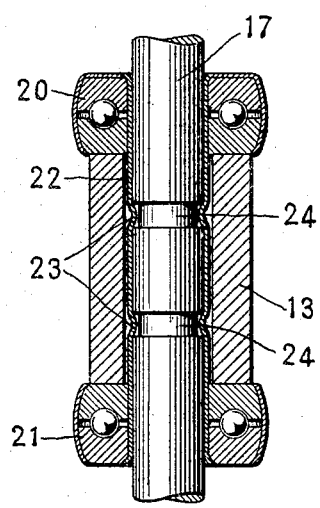
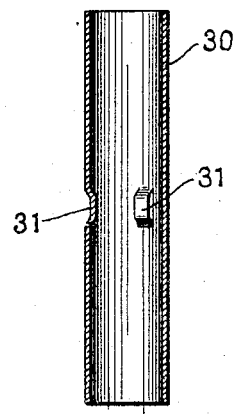
INVENTOR
Walter H. Hart,
BY
ATTORNEY Patented Sept. 29, 1931

1,824,886

UNITED STATES PATENT OFFICE

WALTER HENRY HART, OF NEW BRITAIN, CONNECTICUT, ASSIGNOR TO THE STANLEY WORKS, OF NEW BRITAIN, CONNECTICUT, A CORPORATION OF CONNECTICUT

HINGE CONSTRUCTION

Application filed June 19, 1929. Serial No. 372,042.

My invention relates particularly to hinges consisting of two parts connected by a detachable pin or pintle.

One object is to provide a hinge of this kind that is simple in construction, inexpensive to manufacture and durable in use.

Another object is to provide expansible means to permit the ready insertion of the pin.

Another object is to provide an antifriction hinge with means for retaining the pin.

Still another object is to provide a hinge that is characterized by fewness of parts and by a minimum wear on said parts in use.

Another object is to provide a construction which eliminates the customary lateral projection of the pin, thus permitting its insertion in any position of rotation.

Another object is to provide a construction which can be made and assembled at a minimum cost.

In carrying out the invention in its preferred form, the antifriction devices are secured to one of the knuckles of the hinge by a thin tubular member which is provided with one or more resilient projections adapted to automatically engage any corresponding grooves in the pin when the pin is inserted. This tubular member is expansible and is so disposed relative to its associated parts as to permit such expansion in use.

The invention is susceptible of many variations in detail and is broadly applicable to structures such as shown in the Myers Patents 1,409,461 and 1,484,610 and the Raymond Patents 1,639,633 and 1,639,634.

Fig. 1 shows one form of construction embodying my invention as applied to a butt hinge, one leaf being partially broken away.

Fig. 2 shows the pin removed.

Fig. 3 shows one form of anchorage tube.

Fig. 4 is a detail longitudinal sectional view showing one hinge knuckle with antifriction devices and a pin held in place by an anchorage tube.

Fig. 5 shows a longitudinal sectional view of a modified anchorage tube sleeve.

The construction and design of the leaves and the number of the knuckles is immaterial to my present invention. I have shown leaves 10 and 11 which respectively have knuckles 12, 13 and 14 on the one side and 15, 16 on the other side. These knuckles are provided with longitudinal passages constituting a bore for the pin 17. This pin may be provided, if desired, with grooves such as 18 and 19 for the reception of lubricant.

The hinge is also preferably provided with antifriction devices such as the ball bearing members 20 and 21 which are anchored for instance to one of the knuckles as 13 by means of a tubular split sleeve 22, which passes through the bearing units and through the knuckle. This may be of very thin material which will take up a little space and yet afford sufficient strength to hold the bearing units in place.

In the simple form shown in Figs. 3 and 4 this sleeve 22 is provided with a number of interiorly projecting beads such as 23. In this case there are two of these beads spaced apart from each other longitudinally of the sleeve and adapted to coact with correspondingly located grooves 24 in the pin. The cross section of each bead is somewhat preferably rounded off or inclined so as to facilitate the entrance of the pin and the lower end 25 of the pin is preferably somewhat tapered or rounded off to facilitate entrance.

The edges of the groove 24 are also preferably very slightly rounded off or smoothed so that they will not provide too much cutting action or resistance to insertion and removal of the pin. It will be understood that the pin will usually be of steel and the sleeve 22 will preferably be of thin brass which is sufficiently resilient to permit the insertion of the pin and yet sufficiently rigid to hold the parts securely in place. The sleeve 22 or the beads 23 should be sufficiently expansible to permit the insertion of the pin and sufficiently resilient so that the beads will spring out into the grooves 24 when the pin is in its proper place. The bores of the knuckle and bearing units are slightly wider than the diameter of the sleeve 22 to permit the necessary expansion as will be seen from Fig. 4.

It will be seen that the pin is free to turn so that it can rotatably adjust itself to the position of minimum friction. As the pin is cylindrical and without any lateral projections it may be inserted and withdrawn without the necessity of rotating the pin to any particular point.

Obviously the pin can be lubricated in the usual manner and in fact the sleeve 22 may be lubricated in the knuckle 13, if desired.

The sleeve may be itself split and resilient and expansible and contractable or the sleeve may be seamless and provided with resilient beads, tongues or other projections for engaging the pin.

In the form of sleeve 30 shown in Fig. 5, spring tongues 31 are provided adapted to engage in a correspondingly located groove in the pin.

It will be seen therefore that in the forms shown the sleeve performs the triple function of permitting ready insertion of the pin, of holding one or more antifriction bearings to the knuckle and also of resiliently holding the pin in place to prevent its rising.

If the projection such as 23 is not sufficiently resilient to permit the insertion of the pins, the sleeve must expand. In such case the passage through the knuckle should be large enough to permit the necessary expansion without permanently deforming the beads 23.

It should be understood that various modifications in detail may be made within the spirit of my invention.

I claim:

1. A hinge comprising leaves having coacting knuckles, a pin removably mounted in said knuckles for connecting the same, said pin formed with spaced peripheral grooves, antifriction devices positioned at each end of one of said knuckles, a sleeve mounted in the bore of said latter knuckle for holding said knuckle and antifriction devices together, and spaced rows of resilient beads formed on the interior of said sleeve and adapted to rest in grooves of said pin whereby said pin is yieldingly held in position.

2. A hinge comprising leaves having coacting knuckles, a resilient sleeve in one of said knuckles, a pin passing through said knuckles and through said sleeve, said pin being formed with a groove, and an inwardly extending projection in said sleeve adapted to coact with said groove to hold the pin in place, said knuckle being closely adjacent said sleeve but large enough for expansion of the sleeve on insertion and removal of said pin without permanent deformation of the projection.

3. A hinge comprising leaves having coacting knuckles, a split resilient sleeve in one of said knuckles, a pin passing through said knuckles and through said sleeve, a plurality of spaced beads formed on said sleeve adapted to cooperate with said pin to retain the latter in position, and means for limiting the expansion of said split sleeve adjacent each end thereof.

4. A hinge comprising leaves having coacting knuckles, a removable pin for holding the knuckles in operative position, at least one of the knuckles being provided on the inside with a split expansible sleeve, means for yieldably holding said sleeve in position in the knuckle, said sleeve being provided with an inward projection adapted to cooperate with a groove in said pin for yieldably retaining the pin in position, the inward projection of the sleeve being more readily yieldable than the means for holding the sleeve within the knuckle.

5. A hinge comprising leaves having coacting knuckles, at least one leaf being provided with two knuckles, a removable pin passing through both knuckles, an anti-friction device secured to one knuckle but not to the other, an expansible sleeve securing said anti-friction device to its knuckle, passing into said knuckle, and provided with an inwardly extending projection on the inside of said sleeve for yieldable cooperation with a recessed portion of said pin, said knuckle being closely adjacent said sleeve but large enough for expansion of the sleeve on insertion or removal of said pin without permanent deformation of the projection.

WALTER HENRY HART.